(12) United States Patent
Schuppan et al.

(10) Patent No.: US 8,859,028 B2
(45) Date of Patent: Oct. 14, 2014

(54) COATED FOOD PARTICLE AND METHOD FOR MAKING A SWIRL

(75) Inventors: Robert Schuppan, Olathe, KS (US); James L. Thomasson, Gardener, KS (US)

(73) Assignee: Cereal Ingredients, Inc., Kansas City, MO (US)

( * ) Notice: Subject to any disclaimer, the term of this patent is extended or adjusted under 35 U.S.C. 154(b) by 0 days.

(21) Appl. No.: 10/460,759

(22) Filed: Jun. 12, 2003

(65) Prior Publication Data

US 2005/0226971 A1 Oct. 13, 2005

Related U.S. Application Data

(60) Provisional application No. 60/389,014, filed on Jun. 14, 2002.

(51) Int. Cl.
*A23L 1/275* (2006.01)
*A21D 13/00* (2006.01)

(52) U.S. Cl.
CPC ............. *A23L 1/275* (2013.01); *A21D 13/0067* (2013.01)

USPC ........... 426/302; 426/103; 426/249; 426/250; 426/516; 426/560; 426/650

(58) Field of Classification Search
USPC .......... 426/302, 103, 249, 250, 516, 560, 650
See application file for complete search history.

(56) References Cited

U.S. PATENT DOCUMENTS

| | | | |
|---|---|---|---|
| 3,940,226 A | | 2/1976 | Verhoeven et al. ........... 425/375 |
| 3,949,094 A | * | 4/1976 | Johnson et al. ................. 426/99 |
| 4,702,926 A | | 10/1987 | Fowler .......................... 426/283 |
| 5,069,918 A | * | 12/1991 | Graf et al. ..................... 426/243 |
| 5,731,022 A | | 3/1998 | Cummins ..................... 426/231 |
| 5,798,132 A | * | 8/1998 | Chen et al. ................... 426/305 |
| 5,843,503 A | | 12/1998 | Clanton et al. ................ 426/249 |
| 6,110,511 A | * | 8/2000 | Rollins et al. .................. 426/94 |
| 2002/0192352 A1 | * | 12/2002 | Dar ............................... 426/601 |

* cited by examiner

*Primary Examiner* — Lien T Tran
(74) *Attorney, Agent, or Firm* — Michael A. Williamson; Polsinelli PC

(57) ABSTRACT

The present invention comprises an edible swirl imparting carrier for flavor or color or flavor and color. The edible carrier comprises a coating effective for imparting a color in a viscous or visco-elastic matrix when moved in the matrix. The present invention also includes a method for imparting a swirl of color in a viscous or visco-elastic medium.

23 Claims, No Drawings

COATED FOOD PARTICLE AND METHOD FOR MAKING A SWIRL

CROSS REFERENCE TO RELATED APPLICATION

This application claims the benefit of the filing date of U.S. Provisional Patent Application Ser. No. 60/389,014, filed on Jun. 14, 2002, the disclosure of which is incorporated by reference herein.

FIELD OF THE INVENTION

The present invention relates to a coated food particulate that is fabricated to impart a swirl of color when added to a viscous or visco-elastic food medium. The present invention also relates to a method for making a swirl of color in a viscous or visco-elastic medium.

BACKGROUND

One method of imparting a cinnamon-based swirl in a dough product such as a breakfast roll has typically required an article such as a board for rolling out a dough. A mixture of an oil or fat, such as butter, cinnamon and sugar, has been applied to the top of the rolled-out dough. The dough is then rolled into a spiral shape to form a spiral swirl within the dough. One problem with this method is that the dough has not tended to adhere within the spiral. As a consequence, during baking, spaces are formed within the dough spiral. The baked product has tended to open up and dry out, either during transit or during transfer from the commercial packaging to manipulation by the end user. The dried out product is not desirable to consumers.

The Fowler patent, U.S. Pat. No. 4,702,926 issuing Oct. 27, 1987, describes a multi-component dough product made by a process that includes depositing dough in a mold. Once deposited, the dough is embossed in the mold to form an impression. The impression is filled with an edible second component to form a two-component dough product. The two-component dough product is deposited on a conveyer.

The Clanton et al. patent U.S. Pat. No. 5,843,503 issuing Dec. 1, 1998, describes a method wherein a plastic extrudable food product is provided and mixed with an additive to form a patterned food product. The pattern is formed in a device such as a die. A cross-sectional area of the patterned food product is reduced from an inlet end to an outlet end by a factor of at least about 50:1 at an average convergence angle of less than 45 degrees while maintaining the cross-sectional pattern to form a reduced cross-sectional patterned dough. The dough is then extruded through a die port having an opening equal to the reduced cross-sectional area, forming a patterned extrudate. An additive is injected through ports into an interstitial gap within the device. The gap is formed by an annular shoulder between the periphery of flowing dough and the interior wall surface of the passageway. The gap provides a topical coating at the periphery of the flowing dough to lubricate and to reduce friction at the periphery of the flowing dough and to provide a surface discoloration on the periphery of the flowing dough.

The Cummins patent, U.S. Pat. No. 5,731,022 issuing Mar. 24, 1998, describes a method for dispensing dough. The method includes conveying dough into an auger that pressurizes and imparts downstream impetus to the dough. The pressurized dough is transferred to a confining region having an upstream zone which establishes a first operating dough pressure and a downstream zone which establishes a second operating dough pressure. The pressurized dough is advanced from the upstream zone to the downstream zone by a positive displacement metering device. A control of the emergence of the dough occurs within the downstream zone of the confining region.

The Verhoeven patent, U.S. Pat. No. 3,940,226 issuing Feb. 24, 1976, describes a method for automatically dispensing a measured amount of food onto a moving conveyer. With this method, a cookie dough is fed from a hopper into a bank of piston-like chambers. The chambers include one or more nozzles. Dough in a measured amount is deposited onto a moving conveyer beneath the nozzle by piston-like action of the chambers which compress to urge the measured amount of dough through the nozzles.

The nozzles are universally mounted to the chambers, so that the nozzle axes along which the dough is dispensed can be swiveled freely at an angle to a generally vertical axis. The nozzles are interconnected by a planar means or mechanism, preferably in the form of a plate, through which the nozzles extend and are universally connected to the plate so that as the plate is driven arcuately in a plane. The nozzles are likewise rotated simultaneously to deposit dough smoothly in a swirled design.

SUMMARY OF THE INVENTION

One embodiment of the present invention includes an edible carrier for color or for flavor and color wherein the edible carrier is coated with a coating that imparts a swirl to a viscous or visco-elastic matrix when the particle is added to the matrix. The edible carrier includes a starch-containing material, a bulking agent and a coloring agent or a coloring and a flavoring agent. The edible carrier retains the coloring, except for the coloring in the coating, when the edible carrier is submersed in a viscous or visco-elastic matrix for an extended period of time and is cooked.

One other embodiment of the present invention includes an array of edible carrier particles of at least two different colors or colors and flavors. The edible carrier particles are coated with a swirl-making coating of the present invention. The edible carrier particles comprise a fill portion and a shell portion that enrobes the fill portion, and a coating that coats the particles. The fill portion is comprised of flour and sucrose in a weight ratio of about 1:1. The shell portion is comprised of flour and sucrose in a weight ratio of about 2:1 flour to sucrose. The swirl-imparting coating includes coloring and a binder that permits the particle to impart a swirl to a viscous or visco-elastic matrix when the particle is added to the matrix and moved within the matrix.

Another embodiment of the present invention includes a fruit particle analog. The analog comprises flour, a bulking agent and a coloring agent or a coloring and a flavoring agent, and a coating that coats the particle. The analog has a texture ranging from soft to flinty depending upon the ratio of flour to bulking agent. The analog retains the color or flavor when added to a dough or a batter matrix. The coating imparts a swirl to a viscous or visco-elastic matrix when the particle is added to the matrix and moved within the matrix.

Another embodiment of the present invention includes a coated chocolate chip analog. The coated chocolate chip analog comprises flour, sucrose in a concentration by weight of about 1:1 with the flour and a chocolate coloring and flavoring. The chocolate chip analog maintains its shape and retains its color when it is baked in a dough or a batter and is subjected to an elevated temperature. The coating imparts a swirl to a viscous or visco-elastic matrix when the coated chocolate chip analogs are added to and moved within the matrix.

One other embodiment includes particles, namely nuts, coated with an aqueous-based coating that includes one or more dyes or Lakes, sucrose, and, optionally, a flavoring.

One other embodiment of the present invention includes an edible array of coated carrier particles of color or color and flavor, such as confetti. The array comprises a first collection of edible coated carrier particles of substantially the same color wherein the particles comprise components of flour and sucrose in a weight ratio of 1:1. The edible array also comprises a second collection of coated edible particles of substantially the same color, the color being different from the first collection. The first collection and the second collection are mixed together to form the edible array. Swirls of multiple colors and symmetries are formed by the particles when they are added to a viscous or visco-elastic matrix and moved.

One other embodiment of the present invention includes a method for making a swirl in a viscous or visco-elastic matrix that includes providing edible particles coated edible color or flavor and color carrier. The particles are added to a viscous or a visco-elastic matrix. The particles imparting a swirl to the viscous or visco-elastic matrix when the particles are added and moved within the matrix.

One other method of the present invention includes a method for making bread with a coated color carrier in a bread machine. The method comprises providing a coated color carrier wherein the carrier comprises flour to sucrose in a ratio of at least about 2:1 to make a carrier with a flinty texture. The coated carrier is added to the bread machine. A dough is prepared in the bread machine so that the coated carrier is mixed with the dough. As the coated carrier is mixed, the carrier imparts a swirl of color and, optionally flavor, to the dough. The dough is baked to make a baked product with a discrete carrier and a swirl within the dough.

DETAILED DESCRIPTION

The present invention includes a coated food particle effective for imparting a swirl color and, optionally, a flavor, in a viscous or visco-elastic matrix, when the particle is moved within the matrix. The present invention also includes a method for making a food particle that is effective for imparting a swirl color and, for some embodiments, a swirl flavor in a viscous or visco-elastic matrix. The present invention additionally includes a method for imparting one or more swirls of color in a viscous or visco-elastic matrix.

The present invention also includes an extruded, coated particulate product comprising a sugar or gum-based bulking agent, flour, and a coloring agent formed, in one embodiment, at a temperature below the crystallization temperature of the bulking agent. It is not required that these ingredients or that additional ingredients comprise a fiber component. Fiber may be derived from sources such as fruit, tuber, nut, cellulose, corn, rice, legume wheat and oat. The water activity of a dried product is low enough to retard microbial growth.

The term "flavor" or "flavoring" as used herein refers to an organoleptic agent in a form of an emulsion, concentrate, aqueous or oil soluble liquid or dry powder which may be added to the mixture either prior to extrusion or after extrusion. Flavorings include any fruit flavors such as berry flavors, apple, cherry, plum, raisin, banana, pear, peach, figs, dates and so on. Flavorings also include any nut flavors, as well as any sweet flavors such as chocolate, vanilla, caramel, butterscotch, lemon, cinnamon, graham, coconut flavors, mint, and so on. Flavorings additionally include any savory flavors such as all meat, game, fowl, fish, dairy, barbeque, smoke, pepper, and vegetable flavors. Flavorings also include any cheese flavors such as parmesan and cheddar.

The term "color" or "coloring agent" as used herein refers to natural or uncertified colors from natural sources or certified colors for the effect of color. In one embodiment, the colors include dyes, certified aluminum lakes or colors derived from a natural source. Coloring agents may be water based or oil based or dry. Coloring agents may be primary colors, blends of colors or discrete mixtures of colors, such as confetti. Coloring agents are added to the particles and to the particle coating.

The term "flour" as used herein refers to a ground starch-based component of a grain in any form available from sources such as wheat, corn, oat, legumes such as soy, rice, tubers, psyllium or combinations of these materials.

The term "sugar or gum-based bulking agent" as used herein refers to substantially all sugars and sugar substitutes, including any monosaccharide such as glucose or fructose, disaccharide such as sucrose or maltose, polysaccharide such as starch, oligosaccharide, or other carbohydrate forms such as gums that are starch-based, vegetable-based or seaweed-based.

The sugar or gum-based bulking agents may, for some embodiments, impart a sweet flavor to the particulate. The sweet flavor may also be imparted or augmented by adding substantially any sugar substitute from any source of plant, mineral or animal or other synthetic source, such as Aspertame or saccharin.

The term "re-work" or "re-worked product" as used herein refers to extrudate of the present invention that is ground and extruded again, as necessary, with an addition of oil or fat, a bulking agent, water and a coloring or flavoring agent to make another extruded product. Materials such as start-up waste, overs and unders, leftover material, and agglomerated by-products of the drying step are re-work ingredients.

The term "fat" as used herein refers to any animal or vegetable fat in solid or liquid form.

Upon exiting the extruder, the extrudate is passed through a die, is cut and is dried. The dried extrudate particles may be subjected to grinding or segregation as required for a final product specification. The temperature of the mixed, dough-like extrudate, within the extruder, in an instance where sucrose is used as the bulking agent, remains below the crystallization point of the sugar. In one embodiment, colors or colors and flavors are added to the dough-like extrudate either prior to entrance to the extruder or with the water.

The method of the present invention may be performed using a single screw or a twin screw extruder or a former. It is believed that some embodiments of the method may be performed with a tableter, peletizer, or a positive displacement pump.

Once extruded, the particle is coated with one or more of a powder, a dye, a Lake, a sugar, a binder, and a flavoring. The coating process is performed by enrobing, spray coating and other coating technique known in the art.

The method of the present invention makes a product having a predictable texture that functions as a superior carrier of color and, for some embodiments, flavor. The particle is coated to impart a pre-selected swirl of desired definition, intensity, and color. It has surprisingly been found that a swirl pattern is imparted in a visco-elastic dough by adding the coated particles to the dough and kneading the dough to impart a swirl in the dough. While kneading is described for some embodiments, it is believed that other movement of particles in a dough or other viscous material such as ice cream, yogurt, or batter in a circular pattern imparts a swirl of color, and optionally, a flavor swirl within the dough, ice cream, yogurt or batter.

In one embodiment, coated particles are added to a dough or a batter at the end of a mixing or kneading cycle. For some embodiments, two or more types of particles are added-coated and uncoated particles. One type of particle is free of coating and acts as an analog of a food. Another type of particle is coated and imparts a swirl to the dough when added to the dough. This particle also acts as an analog of a food. Another particle is a food particle such as a nut or a fruit. It is believed that any nut particle coated with an aqueous coating that includes dyes or Lakes or both and, optionally sugar, is suitable for making a swirl in the swirl-making method of the present invention. For some embodiments, the particles include a barrier coating that overlays the color coating. The barrier coating delays release of color into the matrix. Suitable barriers are soluble in the matrix in which the coated particles are added. One barrier is sugar-based. Barriers also include, in some embodiments, gums, fats, starches or combinations of these materials.

The symmetry of the coated, swirl-imparting particles ranges from spherical to cylindrical to asymmetrical. The size of the particles is such that the longest radius is about ¾ inch in length. The smallest particles are those retained on a sieve size 20.

In one embodiment, the sugar or gum based bulking agent utilized is sugar in a form of sucrose. It has surprisingly been found that a ratio of sucrose-to-flour in a premix is determinative of the final texture of the extruded product, not only out of the extruder and after drying, but also in a final matrix such as a dough or batter or a cooked or baked lamellar- or crumb-structured material. A ratio by weight of 2:1 of sucrose-to-flour makes a particle that maintains its integrity in a dough or batter but changes during a process of baking or cooking the dough or batter. The change that the particle undergoes is characterized by a "bursting" of the particle and a partial dissolution of the sugar. Typically, the combined weight of sucrose and flour in the particle is about 50 to 90 percent by weight of the particle.

Increasing the ratio of sucrose-to-flour to greater than 2:1 makes a particle with sucrose that is so crystalline that the particle melts away in the product, leaving a point of color and/or flavor in a form of an air pocket where the particle had been. This type of particle simulates products such as candy. Particles with this ratio of sucrose-to-flour may be extruded at a higher temperature, greater than 110 degrees Fahrenheit.

The particles of the present invention may be made with "re-worked" extrudate to make a new extrudate product of the present invention. The re-extrusion is possible because of the very small temperature increase generated as a consequence of extrusion. The low temperature does not produce a significant chemical change, such as sucrose crystallization in premix constituents.

To use the re-worked extrudate, the extrudate particles are ground to a consistency within a range of size of flour particles and particles of the sugar or gum-based bulking agent. The ground particles are added to the premix and are used as a substitute for either the flour or the bulking agent or both the flour and the bulking agent. The premix with the ground extrudate is introduced into the extruder and is then extruded to form a new extrudate product. Colorings or colorings and flavorings are added to the premix or the extrudate. Once formed, the particles are coated with a color and optionally a flavor, that imparts a pre-selected swirl in a matrix.

A particle made from a premix with a ratio by weight of 1:1 sucrose-to-flour makes a particle that has stability outside of a dough or batter, within a dough or batter for long-term storage, such as six weeks, and within a baked lamellar structure such as a bread or crumb structure such as a cake or cookies. The swirl formed from the particle coating is also stable.

By "significant heat" is meant that the extrudate temperature does not exceed about 95 to 100 degrees Fahrenheit for most embodiments. This combination of the 1:1 sucrose-to-flour ratio and low extrusion temperature produces a condition whereby the sucrose remains below its crystallization point. It is believed that this chemical state of the sucrose renders the analog stable during long term storage and stable in matrices of high water concentration.

A particle made from a premix having a weight-to-weight ratio of 1:2 sucrose-to-flour is usable in processing conditions that are extremely harsh, such as processing conditions in the making of bread with a bread machine. With this embodiment, the combined weight of sucrose and flour is at least about 75% of the weight of the particle. In bread machines used in the home, it is common for a baker to add all ingredients to the bread machine and to let the ingredients sit or mix for an extended period of time. The mixing process in the bread machine is harsh. If particles such as real blueberries, or raisins or cherries are added to the bread machine, the particles are ripped to shreds. The effect aesthetically is unsatisfactory to the consumer. Color from the fruit "bleeds" into the dough.

One embodiment of the particles of the present invention has a flinty consistency that permits the particles to retain their structural integrity even in the harsh conditions of mixing, proofing and baking in the bread machine. In the baked good, such as a baked bread, the particles acquire a softened or a chewy texture. Furthermore, the particles carry and "hold" color. The particles themselves do not "bleed" color and do maintain their structural integrity in the dough and finished bread matrix. As a consequence, when the flinty particles are coated, the swirl image is carefully controlled by controlling the coating composition and thickness and the degree of movement of the coated particle in the dough. The particle itself does not degrade or bleed color into the dough. Guar gum may also be added to this particulate embodiment in order to "tenderize" the particulate. The guar gum augments the sucrose or substantially replaces the sucrose. The particles of the present invention produce a bread with a good flavor, eye appeal, and extended shelf life. Thus, for some embodiments, the particles themselves exhibit some bleeding, apart from the swirl imparted to a matrix by dissolution of the coating.

The particle embodiment made with a 1:1 ratio of sucrose-to-flour actually softens in the crumb or lamellar matrix. Even though the particles undergo a substantial change in texture, from flinty to soft, the particles retain color or flavor. For some colors, particularly the aluminum lakes, the presence of water in the matrix hydrates the color and intensifies the color. This effect is unexpected because water would typically promote "bleeding" of the color in the particle, not intensification. The water does promote bleeding of the coating on the particle. The texture of this type of particle may be rendered more tender by an addition of guar gum. The guar gum concentration may be in a range of 1 to 3 percent.

It has surprisingly been found that adjusting the ratio of sucrose-to-flour not only predictably adjusts texture of the particles of the present invention but also produces excellent particulate carriers of color and flavor over the spectrum of textures. This result is surprising because it has conventionally been thought that multiple textures are obtained by completely different formulation strategies and extrusion strategies. Furthermore, it has been believed that water activity ranges need to be quite high in order to obtain certain textures.

These high water activities are not conducive to carrying and maintaining color, particularly in another matrix of high water activity. The particles of the present invention do not have a high water activity, which increases their storage life. The particles do maintain full color, flavor and piece integrity, even after at least about four weeks of immersion in a matrix such as yogurt, frostings, purees, ice cream, and low water activity filling. Furthermore, the coated particles retain a swirl imparting capacity, even if stored over an extended period of time. Consequently, the particles of the present invention carry color independently of the coating.

Irrespective of the type of texture imparted to the particle, the particle of the present invention displays an improved ability to carry color and a combination of flavor and color as compared to a fresh or dried fruit or other food. The particle does not bleed color unless color bleed is desired for particular products. The use of aluminum lakes substantially prevents the product from bleeding color when used in conjunction with the low extrusion temperature. As a consequence, reduced color and flavor agent concentrations are employed to achieve superior results with respect to enhancement of the color and flavor. If bleeding is desired to some degree, color bleed from the particles as opposed to the coating is controlled in batters, doughs or other materials of high water concentration such as yogurt. A predetermined degree of color dispersion is obtained by adjusting the concentration of dyes and dyes in combination with aluminum lakes in the premix. In particular, the color is held fast by the particulate for some embodiments and is predictably dispersed in a dough or batter for other embodiments. The color composition and intensity may be altered with an addition of natural colors or dyes. Thus, the particles themselves, apart from the particle coating, may impart a color or flavor to a viscous or visco-elastic matrix.

Because of these features, the particles of the present invention have use not only as fruit analogs but also as analogs for other types of foods. For instance, many consumers have allergies to foods such as shellfish and peanuts. The food analogs may be added to foods such as salads, soups, and pizza to impart a flavor and texture of the actual food without risk to the sensitized consumer. The coating on the particles imparts a swirl in the dough, in addition to the function of the particle as a food analog.

In one embodiment, the particles are made by extrusion of a premix through a pitched screw configuration extruder. In particular, the screw has a pitch of about 90° closest to addition of the premix and an increasingly shallow and angled pitch approaching a die. The sugar, water, fat and flour are blended and "greased" through the extruder by a fat component. The fat component concentration is low because fat serves a function of reducing friction of the dough-like mixture in the extruder so that the mixture can be extruded without generating a substantial shear.

The screw is enclosed by jacketed barrels. The barrels define channels that in one embodiment have a spiral pitch. A use of the horizontal markings on the barrel tends to increase shear of the extrudate. For some particle embodiments, the jacketed barrels are cooled by running water at a temperature within a range of 1.5° C. to 22° C. through the barrels, thereby indirectly cooling the extrudate. In another embodiment, the jacketed barrels have no water running through them, producing an extrudate at an ambient temperature. In yet another embodiment, the jacketed barrels are heated by running water between 22° C. and 110° C. through the barrels in order to heat the extrudate.

Water that is added directly to the premix particles can be added at a temperature between about 1.5° C. and 110° C., thereby making it possible to obtain the same results in the extrudate as in cooling or heating jacketed barrels with water.

Processing aids may be added to particles in the premix prior to extrusion, or in the extrudate during extrusion. In one embodiment, flavor or color is dispersed in water or vegetable oil or other materials which are liquid or gas at ambient room temperature. The dispersed flavor or color is injected into the extruder at any point of the extruder by way of an inlet through the jacketed barrel. A processing aid such as carbon dioxide may be injected into the inlet of the extruder to have a desirable effect on the texture of the extrudate.

Other processing aids include monoglycerides, diglycerides and emulsifiers. These aids provide lubricity to the extrudate thereby supplementing fat in lubricating extrudate through the extruder. These aids also aid in dispersing a water phase and an oil phase and prevent "sticking" of an extrudate.

Once the extrudate is extruded, cut and dried to produce a particulate product, the product is homogeneous in nature. As the extrudate exits the extruder, the extrudate is pressed through a die plate. The die plate is at one end of the pitched screw. The die plate may be configured to define holes of variable diameter, depth and symmetry. The die plate may be fashioned with one or more holes by which the extrudate exits. The exit holes may be engineered to a variety of diameters and shapes. In one embodiment, the exit holes are uniform concentric circles having a diameter of about 4.75 millimeters.

While the shape and diameter of the extrudate is determined by the shape and size of the exit hole in the die plate, the length of the extrudate particle is determined by a rotating knife or knives that are either internal or external to the die at the end of the die plate. As the extrudate exits the die plate in the diameter and shape that is determined by the die plate, the variable-speed knife or knives cut a specified length. The knife speed is determined by a rate at which the extrudate exits the die plate and by the length of the specific embodiment desired.

In one embodiment, the extrudate passes through a concentric circle-based die plate and knives that have a slight drag on the extrudate, thereby creating an oval shape of approximately one millimeter in length. In another embodiment, the extrudate takes a shape of a concentric circle or circles ranging From 1.25 millimeters to 10 millimeters. The extrudate is cut at a range of one millimeter up to 10 millimeters or more depending upon the desired application. The extrudate exits the extruder with a moisture content of about 2 to 20% by weight. While cutting particles is described, particular embodiments make particles by grinding or milling.

Once cut, the extrudate is transferred to a dryer to be dried to a desired moisture of between 2 to 20%. In one embodiment, the dryer is a fluidized stainless steel bed that the extrudate transfers through by way of vibration until the extrudate is at a desired moisture. In another embodiment, the dryer is a single or multistage dryer with perforated or non-perforated beds whereby each stage in the dryer may be set to different temperatures in order to temper the product properly to maintain discrete particles.

Although most sizes are achieved through the process of extrusion, it is possible to achieve the desired particle size by extruding a particle of 2 to 20 millimeters and then grinding, cutting, or otherwise fractionating this particle down to other sizes, thereby creating a variety of sizes and lengths. The particles may also be screened and segregated to a discrete and uniform particle size.

One other embodiment of the present invention is a use of "natural" or uncertified colors in the particle of the present invention without bleeding into a dough or batter matrix or the baked product. In one embodiment, the colors are certified aluminum lakes or are from a natural source or a combination of the aluminum lakes and the natural source. With an appropriate ratio of flour-to-bulking agent, such as about 1:1 sucrose-to-flour, the color may be held within the product to prevent the "bleeding" or leaching of added color. The color bleed is also controlled by adjusting the concentration of dyes and dyes in combination with aluminum lakes in the premix.

Thus, when the colored particles are added to a white cake batter and baked, the baked cake displays a white crumb structure with points of color in a confetti pattern. The baked cake crumb structure was unaffected by the particles. In particular, a blend of colored particles was prepared with substantially equal amounts of all of the color varieties. When the particles are coated, the appearance of the cake is one of swirls of color and points of color.

Presented herein are examples of specific embodiments of the method and product of the present invention. These examples are intended to further describe the present invention and are not intended to limit the scope of the present invention.

Example 1

Prior Art Cinnamon Particles

The cinnamon particles were made from the following formulation:

| Ingredient | Weight Percent |
| --- | --- |
| Granular Sugar | 50.00 |
| Wheat Flour | 23.75 |
| Other | 17.72 |
| Cinnamon | 8.33 |

The cinnamon particles were made in an extrusion process such as is described herein. When the particles were added to a dough and kneaded into the dough, the particles did not produce a swirl.

Example 2

Coated Cinnamon Particles

| Ingredient | Percent |
| --- | --- |
| Granular Sugar | 50.00 |
| Wheat Flour | 23.75 |
| Other | 17.92 |
| Cinnamon | 8.33 |
| COLOR | |
| Granular Sugar | 2.33 |
| Water | 1.04 |
| Brown Shade | 0.29 |

The cinnamon color is imparted by the dye in the coating. The cinnamon flavor is imparted by the particle itself. The coated particles were made by blending the sugar, flour, and other ingredients to form a mixture and extruding the mixture. A color solution of sugar, water and the dye listed in the table above was prepared. The extruded particles were coated with the color solution in a spray coating step.

A mixture of the coated particles and uncoated cinnamon-flavored particles was added to a dough. The dough was kneaded in order to move the particles in an arc. The movement resulted in the coated particles forming a swirl in the dough.

Particles added to a bagel dough were added and kneaded with the dough for 30 seconds. After the 30 second period, the bagels were formed and baked.

While a water-based coating is described, oil based coatings are also suitable for use in the swirl-making method of the present invention. The oil based coatings are used to create one or more swirls in a high fat matrix such as ice cream.

While a method for making a single swirl is described, it is understood that particles added to a matrix, in some embodiments, make multiple swirls and designs made by the swirls. In some instances, the designs are pre-selected. For some embodiments, the swirls have different colors.

It is to be appreciated that the embodiments of the present invention have been described in particular detail with respect to preferred methods of making and structures. The present invention, however, is not intended to be limited to these embodiments. One skilled in the art will readily recognize that the embodiments may be adjusted to accommodate particular food particulate configurations.

The invention claimed is:

1. An edible particle, comprising:
   an extruded particle portion comprising a starch-containing material and a bulking agent and coloring agent or coloring and flavoring agent; and
   an aqueous color coating that coats the particle portion, the aqueous coating comprising a coating coloring agent and coloring agent carrier wherein water and sugar comprise the coloring agent carrier and coating coloring agent comprises one or more dyes or one or more Lakes or both;
   wherein the edible particle retains the coloring agent and does not bleed within the matrix, the aqueous color coating forms a colored swirl in a viscous or viscoelastic matrix when the edible particle is added to the matrix and is moved within the matrix, wherein the edible particle is of a size that is at least large enough to be retained on a size 20 sieve, and wherein the edible particle is of a size such that its longest dimension is in the range of between 2 and 20 millimeters in length.

2. The edible particle of claim 1 wherein the coating portion further comprises an oil.

3. The edible particle of claim 1 wherein the coating color is an aluminum lake.

4. The edible particle of claim 1 wherein the coating color is a natural color.

5. The edible particle of claim 1 further comprising at least one flavoring.

6. The edible particle of claim 1 wherein the bulking agent is sucrose that is free of crystallization.

7. The edible particle of claim 1, wherein the particle portion further comprises a particle coloring agent.

8. The edible particle of claim 1, wherein the coating portion further comprises a barrier comprising one or more of a gum, fat, starch, or combination of these materials.

9. An edible particle, comprising:
   an extruded particle portion comprising a starch-containing material and a bulking agent and coloring agent or coloring and flavoring agent; and
   a coating portion that coats the particle portion, the coating portion comprising a coating coloring agent and coloring agent carrier wherein water and sugar comprise the coloring agent carrier;

wherein the edible particle retains the coloring a ent when added to the matrix the aqueous color coating forms a colored swirl in a viscous or visco-elastic matrix when the edible particle is added to the matrix and is moved through the matrix, and wherein the starch-containing material is flour and the bulking agent is sucrose and the ratio of sucrose to flour in the particle portion is about 2:1 by weight.

10. The edible particle of claim 1 wherein the starch-containing material is flour and the bulking agent is sucrose and the ratio of sucrose to flour in the particle portion is about 2:1 by weight.

11. The edible particle of claim 1 wherein the starch-containing material is flour and the bulking agent is sucrose and the ratio of sucrose to flour in the particle portion is greater than 2:1 by weight.

12. The edible particle of claim 1 wherein the starch-containing material is flour and the bulking agent is sucrose and the ratio of sucrose to flour in the particle portion is less than 2:1 by weight.

13. The edible particle of claim 9 wherein the coating portion further comprises an oil.

14. The edible particle of claim 9 wherein the coating color is an aluminum lake.

15. The edible particle of claim 9 wherein the coating color is a natural color.

16. The edible particle of claim 9 further comprising at least one flavoring.

17. The edible particle of claim 9 wherein the bulking agent is sucrose that is free of crystallization.

18. The edible particle of claim 9, wherein the particle portion further comprises a particle coloring agent.

19. The edible particle of claim 9, wherein the coating portion further comprises a barrier comprising one or more of a gum, fat, starch, or combination of these materials.

20. The edible particle of claim 9 wherein the ratio of sucrose to flour in the particle portion is greater than 2:1 by weight.

21. The edible particle of claim 9 wherein the ratio of sucrose to flour in the particle portion is less than 2:1 by weight.

22. The edible particle of claim 9 wherein the edible particle is of a size such that its longest dimension is in the range of between 2 and 20 millimeters in length.

23. An edible particle, comprising:
an extruded particle portion comprising a starch-containing material and a bulking agent; and
a coating portion that coats the particle portion, the coating portion comprising a coating coloring agent and coloring agent carrier wherein water and sugar comprise the coloring agent carrier;
wherein the edible particle retains the starch-containing material and the bulking agent when added to the matrix, the coating portion forms a colored swirl in a viscous or visco-elastic matrix when the edible particle is added to the matrix and is moved within the matrix, and wherein the edible particle comprises a fill portion and a shell portion that enrobes the fill portion.

* * * * *